United States Patent [19]
Boon

[11] Patent Number: 5,654,805
[45] Date of Patent: Aug. 5, 1997

[54] MULTIPLEXING/DEMULTIPLEXING METHOD FOR SUPERIMPOSING SUB-IMAGES ON A MAIN IMAGE

[75] Inventor: Choong Seng Boon, Moriguchi, Japan

[73] Assignee: Matsushita Electric Industrial Co., Ltd., Osaka-fu, Japan

[21] Appl. No.: 365,192

[22] Filed: Dec. 28, 1994

[30] Foreign Application Priority Data

Dec. 29, 1993 [JP] Japan ................................ 5-349873

[51] Int. Cl.$^6$ ............................................... H04N 1/387
[52] U.S. Cl. ................................... 358/426; 358/450
[58] Field of Search ............................. 358/426, 432–433, 358/538–539, 448, 468, 467, 261.3, 434, 452, 453, 450

[56] References Cited

U.S. PATENT DOCUMENTS

| | | | |
|---|---|---|---|
| 4,187,520 | 2/1980 | Beduchaud et al. | 358/257 |
| 4,665,438 | 5/1987 | Miron et al. | 358/183 |
| 4,868,681 | 9/1989 | Opelt | 358/335 |
| 5,157,742 | 10/1992 | Niihara | 382/56 |
| 5,173,695 | 12/1992 | Sun et al. | 341/67 |
| 5,193,004 | 3/1993 | Wang et al. | 358/136 |
| 5,202,886 | 4/1993 | Rossi et al. | 370/112 |
| 5,216,503 | 6/1993 | Paik et al. | 358/113 |

FOREIGN PATENT DOCUMENTS

| | | |
|---|---|---|
| 0523618A3 | 1/1993 | European Pat. Off. . |
| 0534139 | 3/1993 | European Pat. Off. . |
| 0536897 | 4/1993 | European Pat. Off. . |
| 0566092 | 10/1993 | European Pat. Off. . |

OTHER PUBLICATIONS

Globecom '92, vol. 1/3, 6 Dec. 1992 Orlando, Fla, USA, pp. 245–249, Z.Y. Shae et al., "Mixing and Playback of JPEG Compressed Packet Videos".

"The MPEG Video Compression Algorithm", Didier J. Le Gall, Signal Processing: Image Communication, vol. 4, No. 2, Apr. 1992.

Primary Examiner—Edward L. Coles, Sr.
Assistant Examiner—Stephen Brinich
Attorney, Agent, or Firm—Wenderoth, Lind & Ponack

[57] ABSTRACT

A main image and at least one sub-image for superimposing on the main image are encoded in the following manner. The main image is subdivided into a plurality of main image regions that are compressed and encoded, including location information indicative of a location of each main image region in the main image. The sub-image is subdivided into a plurality of sub-image regions that are compressed and encoded, including location information indicative of a location where each of the sub-image regions is to be superimposed on the main image. Encoded data of the main image and sub-image regions are then arranged in such a manner that a main image region and a sub-image region which share the same location information are concatenated such that the encoded data of the sub-image region precedes that of the main image region. The encoded video sequence thus obtained are decoded in the following manner. A current region is decoded to obtain decoded data. Next, either one of the following steps (1) or (2) is performed if the location information of the current region is the same as that of the previous region: (1) discarding the decoded data of the current region when displaying the sub-image; and (2) displacing the decoded data of the previous region with that of the current region when not displaying the sub-image.

13 Claims, 13 Drawing Sheets

MULTIPLEXING/DEMULTIPLEXING METHOD FOR SUPERIMPOSING SUB-IMAGES ON A MAIN IMAGE

BACKGROUND OF INVENTION

1. Field of the Invention

The present invention relates to a multiplexing/demultiplexing method of at least two encoded digital video data streams for transmission and storage, and more particularly to a multiplexing/demultiplexing method which provides a selective mode for superimposing sub-images on main images.

2. Description of the Prior Art

Digitized video signals are compressed and encoded for transmission and storage at a reduced bit rate. The motion-compensated transform coding algorithm is currently the most widely used method and has been adopted as the key technique by major international standards such as H. 261, MPEG1 and MPEG2 for compressing digital video sequences. A wide variety of literature on this coding method is available, an example of which is published in "The MPEG Video Compression Algorithm," Signal Processing, Image Communication, Vol. 4 No. 2, pp. 129–140, April 1992. Briefly, the algorithm works in the following manner. A current picture is divided into adjacent blocks each containing a matrix of pixel data. For each block, a motion vector is detected by comparing the current block to a reference picture to find the best-matched prediction among possible blocks in the reference picture. The difference between the predicted block and the current block, i.e., the prediction error, is further compressed using an orthogonal transformation to remove spatial correlation. The transformed coefficients are quantized by a quantization parameter to discard the less important information. Finally, the motion vectors and quantization parameters are combined with the quantized coefficients, the location information of each block as well as the other side information for transmission or storage by using fixed or variable length codes.

In the image coding scheme described above and in other schemes, the encoded digital video data, hereafter referred to as data stream, are in Binary ("0" or "1") presentation. The data stream is usually packetized, i.e., arranged in units of packets, and then multiplexed with the audio data stream and/or other data streams for transmission or storage. An identification tag indicative of each of the data stream is appended to every packet for distinguishing the various data streams. U.S. Pat. No. 5,202,886 describes a system for multiplexing/demultiplexing of digital television information, in units of packets, for transmission and reception.

In some applications, such as broadcasting and teleconferencing, there are needs where the main image is supplemented or assisted by a sub-image or a group of sub-images. Examples of the sub-images are closed captions, sign language interpretation for the handicaps, drawings and writings and the image of other speakers during teleconferencing between two points.

In conventional television broadcasting, sub-images for sign language interpretation are superimposed on to the main image before transmission. A similar procedure which can be adopted for digital television system. This method, however, prevents the viewers from selectively displaying the sub-images. In other words, a viewer can not choose whether or not to display a sub-image.

Television receivers that offer a "picture-in-picture" function, where the image received from a second channel is superimposed on to the image of a first channel, requires separate tuners and demodulators for the first and second channels (see for example U.S. Pat. No. 4,665,438). In a similar manner, a digital television receiver can be equipped with multiple decoders for decoding more than one program. In teleconferencing systems, multiple decoders are set up for decoding more than one image.

SUMMARY OF THE INVENTION

An object of the present invention is to provide an encoding/multiplexing method of at least two encoded digital video data streams, one being a main image while the rest sub-images, which enables the viewers to select whether or not to display the sub-image.

Another object of the present invention is to provide a demultiplexing/decoding method of at least two encoded digital video data streams, one being a main image while the rest sub-images, which requires only one decoder.

Still another object of the present invention is to provide a decoding apparatus that is capable of decoding and then displaying (1) a main image only or (2) a main image and at least one sub-image in a superimposed fashion.

In a first aspect of the present invention, a main image and at least one sub-image for superimposing on the main image are encoded in the following manner. The main image is subdivided into a plurality of main image regions that are compressed and encoded, including the location information of each main image region in the main image. Similarly the sub-image is subdivided into a plurality of sub-image regions that are compressed and encoded, including the location information where the sub-image region is to be superimposed on the main image. Finally, the encoded data of the main image regions and sub-image regions are concatenated in such a manner that the regions which share the same location information are concatenated consecutively.

In a preferred manner, the main image regions and sub-image regions which share the same location information are of the same size.

In another preferred manner, for two regions that share the same location information, the encoded data of the main image region and sub-image region are concatenated in such a manner that the sub-image region precedes the main image region. An encoded video sequence thus obtained is decoded in the following manner. First a current region is decoded. Its location is compared with that of its previous region. If the location information of the current region is the same as that of the previous region, either one of the following steps is performed. (1) The decoded data of the current region is discarded when displaying the sub-image. (2) The decoded data of the previous region is displaced with the decoded data of the current region when not displaying the sub-image.

In a second aspect, the present invention provides an apparatus for decoding an encoded video data stream of a main image and at least one sub-image, each of which is divided into a plurality of main image regions and sub-image regions respectively, and each of the main image regions and sub-image regions is compressed and encoded into data stream inclusive of location information, compressed image data and other side information. A parser parses the video data stream, and then extracts the location information, compressed image data and other side information of each of the regions. A decompressor coupled to the parser decompresses the compressed image data based on the other side information to obtain decompressed image data. A controller coupled to the parser and a selector generates an ON/OFF signal to control a switch based on the location information received from the parser and an input signal received from a selector. The input signal received from the selector decides whether the sub-image is to be displayed or not. The switch which is coupled to the decompressor Selectively outputs the decompressed image data based on the ON/OFF signal received from the controller.

In a preferred manner, the controller compares the location information of a current region with that of a previous region. It then generates an ON signal if the location information of the current region differs from that of the previous region. If the location information of the current region is the same as that of the previous region, it performs either one of the following steps: (1) generates an OFF signal when displaying the sub-image; (2) generates an ON signal when not displaying the sub-image.

In a third aspect of the present invention, a main image and at least one sub-image for superimposing on the main image are multiplexed in units of packets in the following manner. The main image is subdivided into a plurality of main image regions that are compressed and encoded, including the location information of each main image region in the main image. The encoded main image data are then packetized into units of packets, to each of which is appended a first identification tag indicative of the main image. Next, the sub-image is subdivided into a plurality of sub-image regions that are compressed and encoded, including the location information where the sub-image region is to be superimposed on the main image. The encoded sub-image data are then packetized into units of packets, to each of which is appended a second identification tag indicative of the sub-image. Finally, the main image and sub-image packets are multiplexed in such a manner that the packets with the same location information are concatenated consecutively.

In a preferred manner, the main image regions and sub-image regions that share the same location information are of the same size.

In another preferred manner, for two packets with the same location information, the main image packet and sub-image packet are multiplexed in such a manner that the sub-image packet precedes the main image packet. A multiplexed sequence thus obtained is demultiplexed in the following manner. When not displaying a sub-image, only packets carrying the first identification tag are selected. When displaying the sub-image, packets carrying the first identification tag as well as packets carrying the second identification tag are selected with the exception that a packet carrying the first identification tag that follows a packet carrying the second identification tag is discarded. All packets thus selected are decoded and decompressed.

DESCRIPTION OF THE PREFERRED EMBODIMENTS

Figure 1:
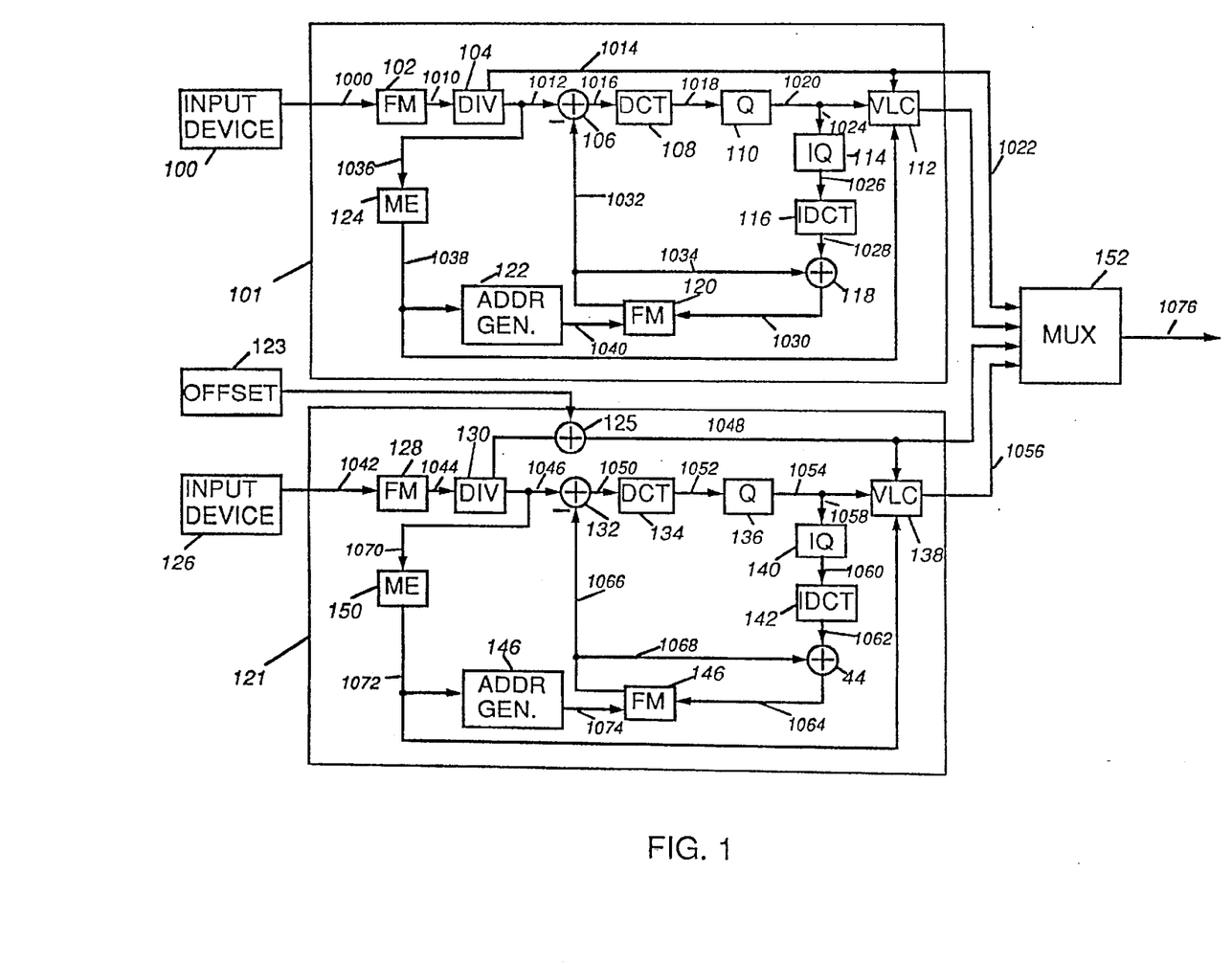
FIG. 1 is a block diagram of an embodiment of an apparatus for encoding a main image sequence and a sub-image sequence in accordance with the present invention.
Figure 2A:
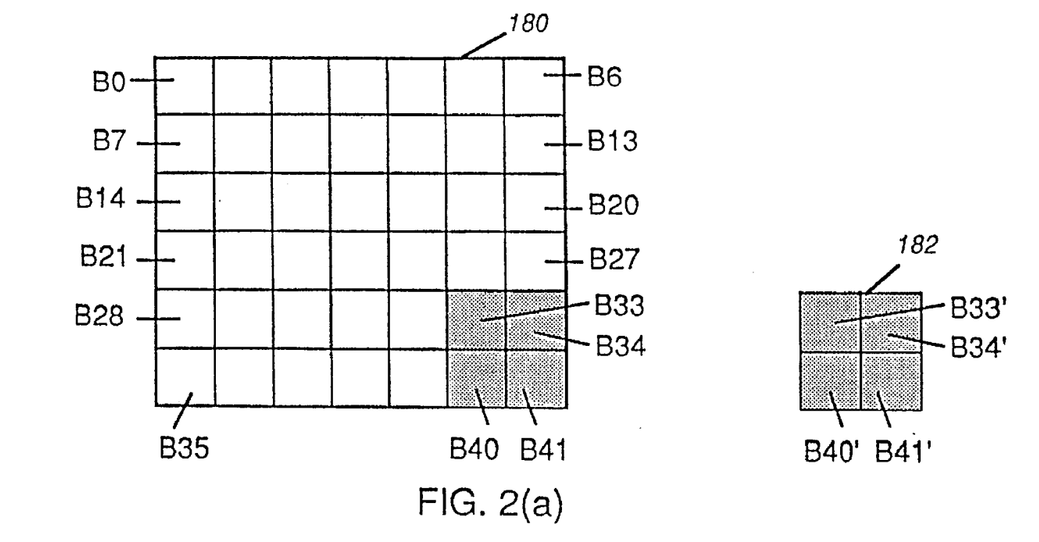
FIG. 2(a) shows an example of an image subdivided into regions of 16×16 blocks.

FIG. 1 is a block diagram of an embodiment of an apparatus for encoding a main image sequence and a sub-image sequence in accordance with the present invention. The main image 180 and sub-image 182 are shown in FIG. 2(a). Sub-image 182 is superimposed on to main image 180 at a predetermined location during display. In FIG. 2(a) sub-image 182 is superimposed at the shaded bottom right corner of main image 180. The input device 100 of FIG. 1 provides main image 180 to an encoder 101. The input device 100 could be a digital video camera or any digital video tape player. Main image 180 is then compressed and encoded into a main image data stream and outputted to a multiplexer (MUX) 152. In a similar manner, sub-image 182 is provided by input device 126, compressed and encoded by encoder 121 to produce a sub-image data stream which is fed into multiplexer 152.

Figure 2B:
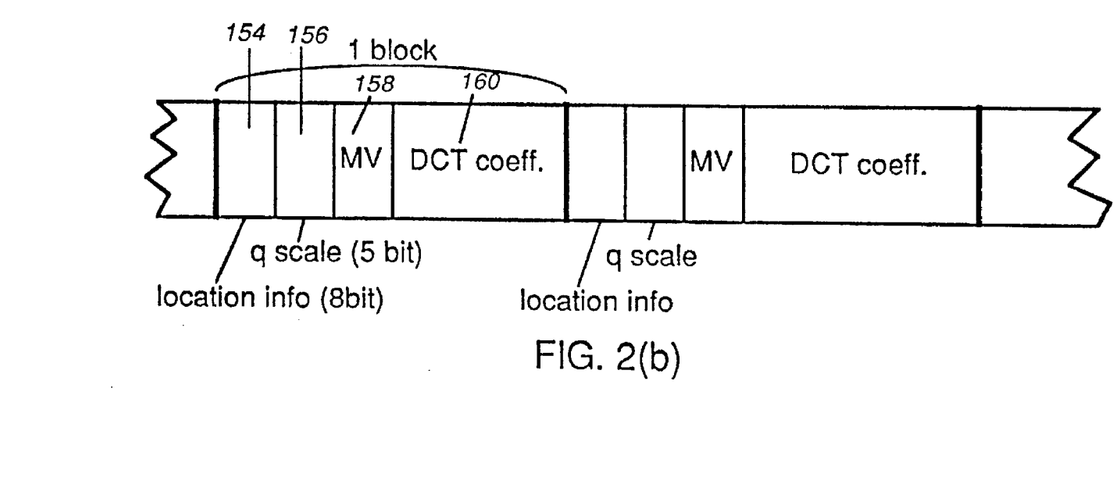
FIG. 2(b) illustrates an encoded data stream.

The encoder 101 operates in the following manner. An image provided by input device 100 is fed into a frame memory (FM) 102 via line 1000. The image is subdivided into a plurality of regions by a block divider (DIV) 104. In a preferred manner, an image is subdivided into blocks of 16×16 pels as illustrated in FIG. 2(a). Main image 180 is subdivided into 42 blocks, B0 through B41 while sub-image 182 is subdivided into 4 blocks, B33' through B41'. DIV 104 also outputs the location information of each target block via line 1014. The position of the top left pixel is taken to represent the location of the a block. Referring to the main image 180, the location of block B0 is (0, 0), block B1 (0, 1), ..., block B7 (1, 0), ..., block B41 (5, 6). For each of the blocks, a motion vector is estimated in a motion estimator (ME) 124 by referring to previous images. Examples of the motion estimator may be those shown in U.S. Pat. No. 5,157,742 and U.S. Pat. No. 5,193,004. A motion vector is the horizontal and vertical distance, in pel, of the corresponding predicted block from the target block. Therefore to get a predicted block from a frame memory, the motion vector is added to the value indicative of the location of the target block to obtain the actual value of the location of the predicted block. This location value is directly mapped onto the frame memory where the previous image is stored. In FIG. 1, the motion vector detected by ME 124 is sent to an address generator (ADDR GEN) 122 which performs the above function to get the predicted block stored in frame memory 120. The predicted block is then sent to an adder 106 via line 1032 where it is subtracted from the target block (received via line 1012), producing a difference signal. The output of the adder 106 is then transformed by a discrete cosine transform (DCT) 108, followed by quantization in a quantizer (Q) 110. The quantized DCT coefficients, quantization parameter, location information (via line 1014) and the motion vector (via line 1038) are coded at a variable length coder (VLC) 112. FIG. 2(b) shows a pictorial diagram of the data stream outputted from a variable length coder 112. The location information 154 is represented by 8 bits, 4 bits for each of the horizontal and vertical coordinate. Quantization parameter 156 is represented by 5 bits. The motion vector 158 and DCT coefficients 160 are represented by variable length codes.

The encoder 121 operates in a similar manner as encoder 101. The location information outputted by DIV 130 is offset to give the position at which sub-image 182 is superimposed on main image 180. The offset value is provided by an offset generator (OFFSET) 123 which could be a simple numerical keyboard. Referring to sub-image 182 of FIG. 2(a), the location of blocks B33', B34', B40' and B41' are respectively (0, 0), (0, 1), (1, 0) and (1, 1). As these blocks are to be superimposed on the shaded area of main image 180, the offset is the location of block B33 of main image 180 which is (4, 5). This offset value is added to the location value of each block of sub-image 182 at adder 125. The data stream outputted from encoder 121 is also in a format as shown in FIG. 2(b).

Figure 3:
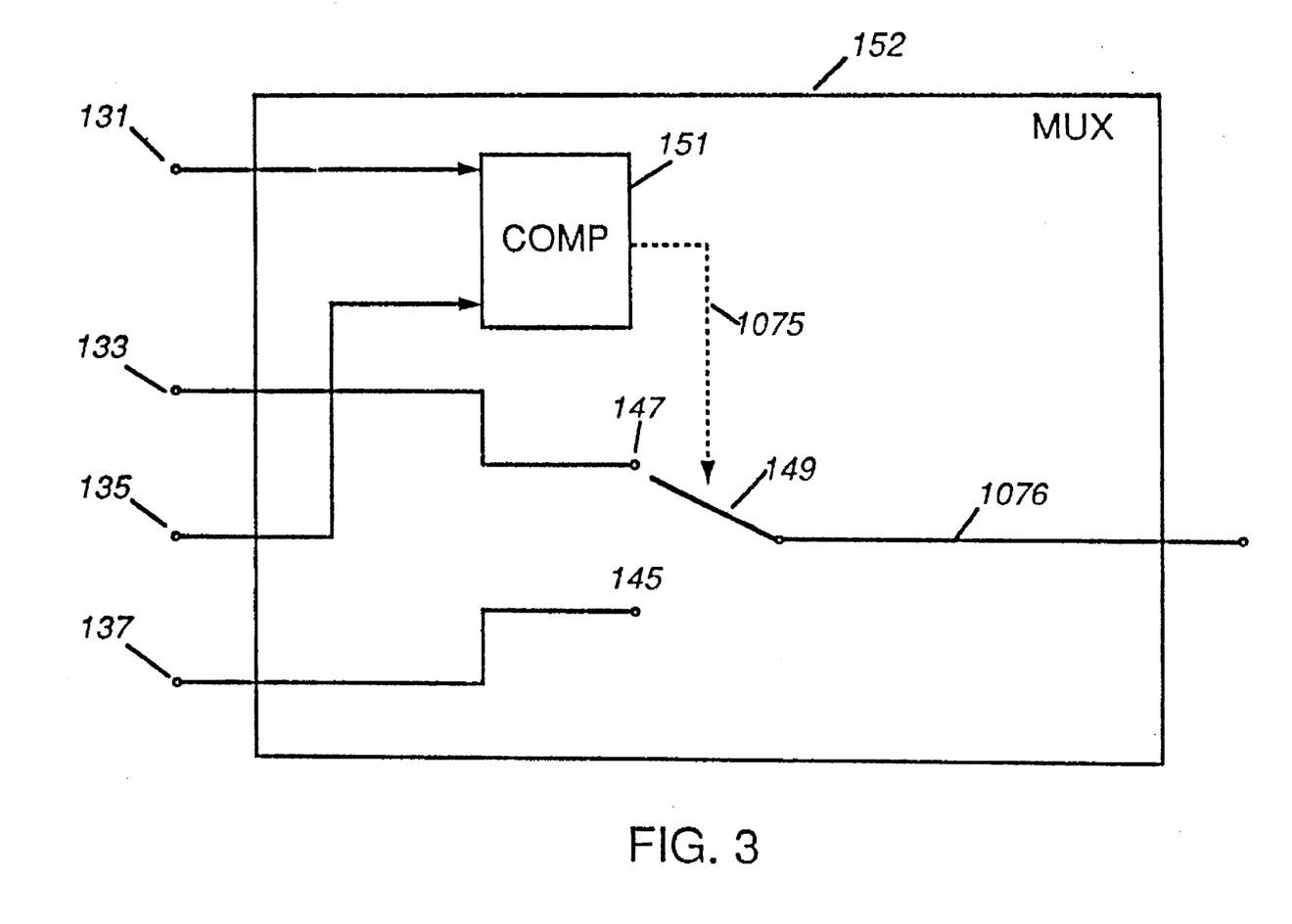
FIG. 3 is a block diagram of an example of a multiplexer illustrated in FIG. 1.
Figure 4A:
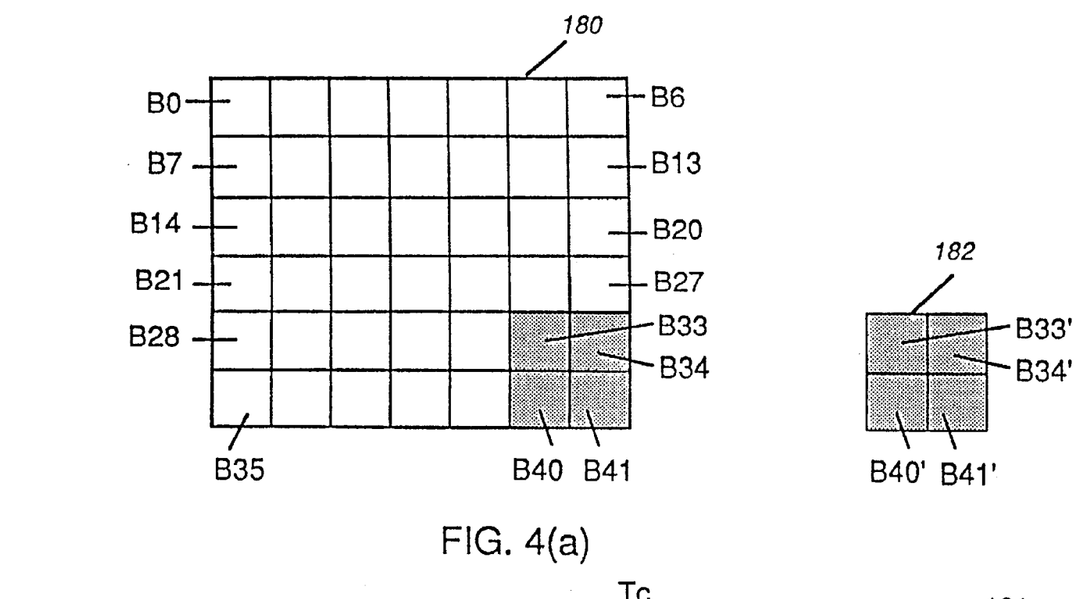
FIGS. 4(a) and 4(b) illustrate an example of how the subdivided regions of a main image and a sub-image are concatenated according to the present invention.
Figure 4B:
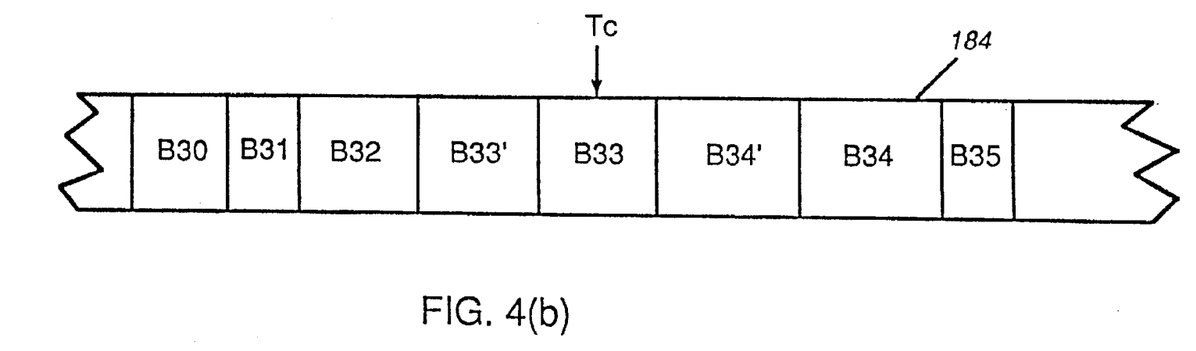

The two data streams are next multiplexed at MUX 152. FIG. 3 is a block diagram of multiplexer 152. The location information and data stream of the main image are fed in through port 131 (via line 1014) and 133 (via line 1022) respectively, while the location information and data stream of the sub-image are fed in through port 135 (via line 1048) and 137 (via line 1056) respectively. First, the location information of the main and sub-image are compared at a comparator 151 which controls a switch 149. After the comparison, if the location information are not the same, switch 149 is connected to port 147 where the data streams of the main image is outputted. If the location information coincide, switch 149 is connected to port 145 and 147 alternatively. First, switch 149 is connected to port 145 to let through the data stream of the sub-image block. Next, switch 149 is connected to port 147 to let through the data stream of the main image block. The process repeats for all the blocks of the main and sub-image. The data streams of main image 180 and sub-image 182 thus concatenated is shown in FIG. 4(b). In data stream 184, block B33' precedes B33, block B34' precedes B34. Similarly, block B40' precedes B40 and block B41' precedes B41 (not shown in the diagram).

Figure 5:
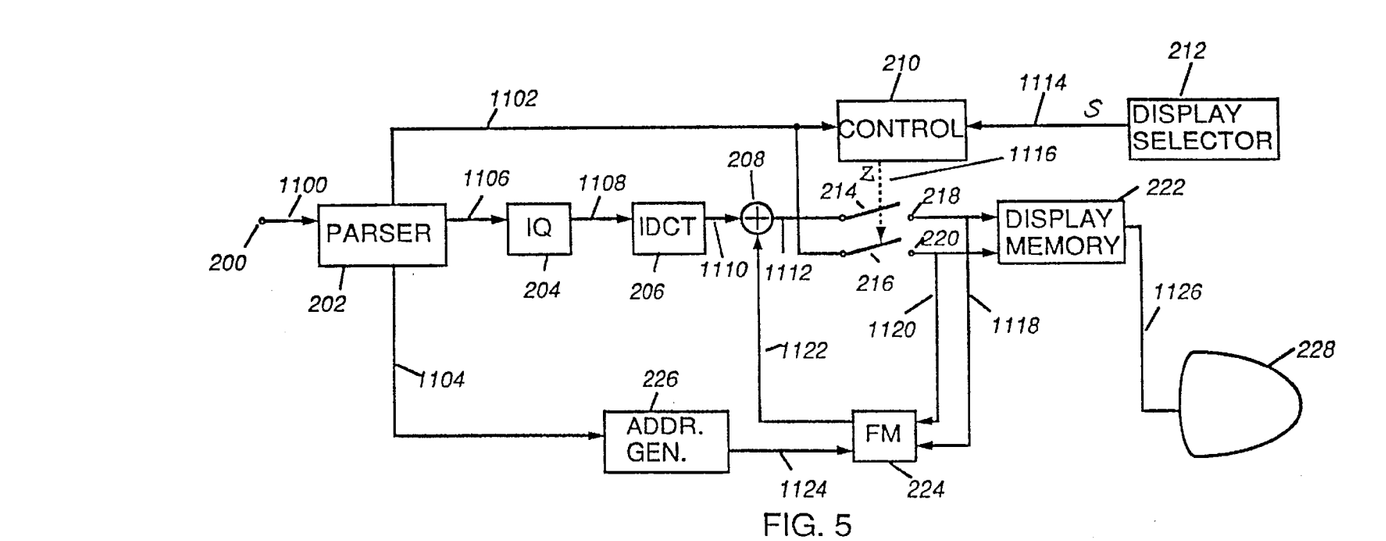
FIG. 5 is a block diagram of an embodiment of an apparatus for decoding a data stream concatenated in a manner according to the present invention.

The data stream thus obtained is decoded in the following manner. FIG. 5 is a block diagram of an embodiment of an apparatus for decoding a data stream concatenated in a manner according to the present invention. The data stream is input through port 200 to a parser 202 via line 1100. The parser 202 parses the input data stream to extract the location information, motion vector, quantization parameter and quantized DCT coefficients of each block. In a preferred manner, the parser 202 is implemented by a programmable digital signal processor (DSP) or a dedicated hardware as shown, for example, in U.S. Pat. No. 5,173,695. The quantization parameter and quantized DCT coefficients are transferred via line 1106 to an inverse quantizer (IQ) 204 where each of the DCT coefficients is multiplied by the quantization parameter. The inverse-quantized DCT coefficients are then transferred via line 1108 to an inverse discrete cosine transform (IDCT) 206 where the coefficients are transformed from frequency domain to spatial domain. The inverse-transformed data is added to a predicted block retrieved from frame memory (FM) 224 at an adder 208. The predicted block is retrieved from a previous image based on the motion vector received from the parser 202 via line 1104. The motion vector is used to offset the location information of the current block at an address generator 226 to generate the address for retrieving the predicted block from FM 224. The output of the adder 208 is transferred to a switch 214. The switch 214 is controlled by a controller 210. The controller 210 received the location information from the parser 202 via line 1102 and an external input signal (S) from a display selector 212 via line 1114. The display selector 212 can be a simple switch operated by the viewer. The external input signal (S) indicates whether or not to display the sub-image. When displaying the sub-image, S=1, else S=0. Based on these input signals, the controller 210 generates an ON/OFF signal (Z) to control switch 214. When ON, switch 214 is coupled to FM 224 and display memory 222. When OFF, switch 214. is left uncoupled to FM 218 and display memory 222. At the same time, the location information via line 1102 is transferred to a switch 216 which is also controlled by the controller 210. When ON, switch 216 is coupled to FM 224 and display memory 222. The location information is mapped to the address of memories 222 and 224, indicating where the corresponding decompressed block is stored.

Figure 6:
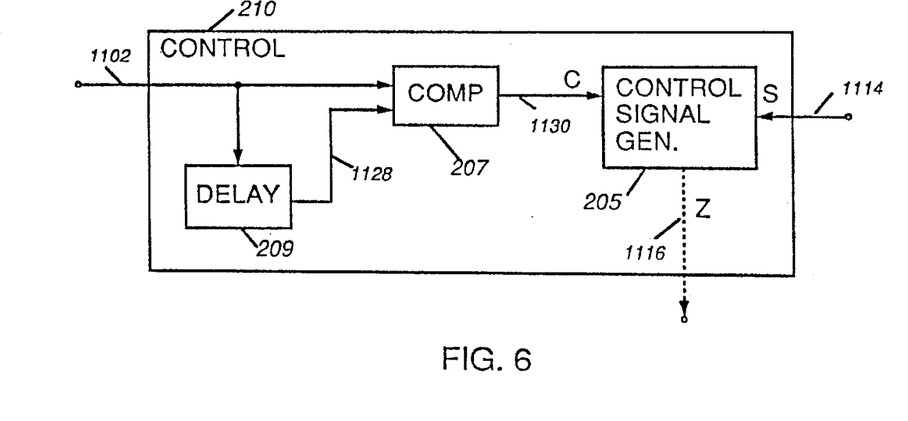
FIG. 6 is a block diagram of an example of a controller illustrated in FIG. 5.
Figure 7:
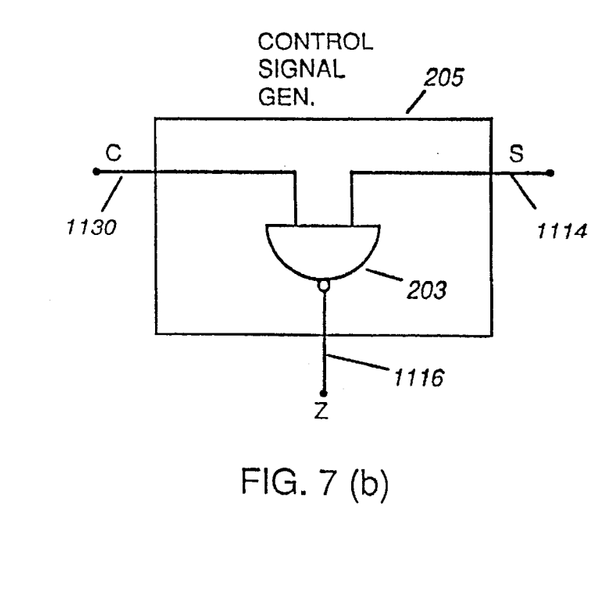
FIG. 7(a) is a flow chart of the decoding method of a data stream concatenated in the manner shown in FIG. 4(b).
FIG. 7(b) is the corresponding block diagram of the control signal generator shown in FIG. 6.

The block diagram of the controller 210 is shown in FIG. 6. The location information transferred via line 1102 is fed into a comparator 207. A delay 209 is used to delay the input data (location information) for a block period. The delayed data, which is the location information of the previous block is also fed into the comparator 207. The comparator 207 compares the location information of the current block with that of the previous block. A signal C is generated and transferred via line 1130 to a control signal generator 205. If the location information coincide, C=1, else C=0. Based on the signals C and S, a control signal Z is generated by the control signal generator 205. FIG. 7(b) shows a simple logic circuit for implementing the control signal generator 205. When C=0 (location information not coincide), an ON signal (Z=1) is outputted regardless of the external input signal S. When C=1 (location information coincide), the external input signal S is inverted to give the output signal Z. The flow chart in FIG. 7(a) explains how the sub-images can be selectively displayed.

FIG. 7(a) is a flow chart of the decoding method of a data stream concatenated in the manner shown in FIG. 4(b). The data stream 184 of FIG. 4(b) is input at step 10. At step 11, each block is decoded and decompressed as described above. At step 12, the location information of the current block is compared with that of the previous block. If the location information differ, it indicates that the location is not for superimposing sub-image 182. Therefore, the decoded data is outputted to a frame memory at step 15. If the location information coincide, it indicates that the location is for superimposing sub-image 182. At step 13, it is checked whether to display sub-image 182 or not, as selected by the viewers. If sub-image 182 is to be displayed, proceed to step 14. As shown in FIG. 4(b), at timing Tc, the previous block B33' carries the data of sub-image 182. Therefore, by discarding the data of the current block, B33, the data of the sub-image remain in the frame memory. If sub-image 182 is not to be displayed, the data of the current block is outputted to the frame memory at step 15. In this manner, the data of block B33' at the same location is over-written by the data of block B33 (main image 180) and hence removing the data of sub-image 182.

Figure 8A:
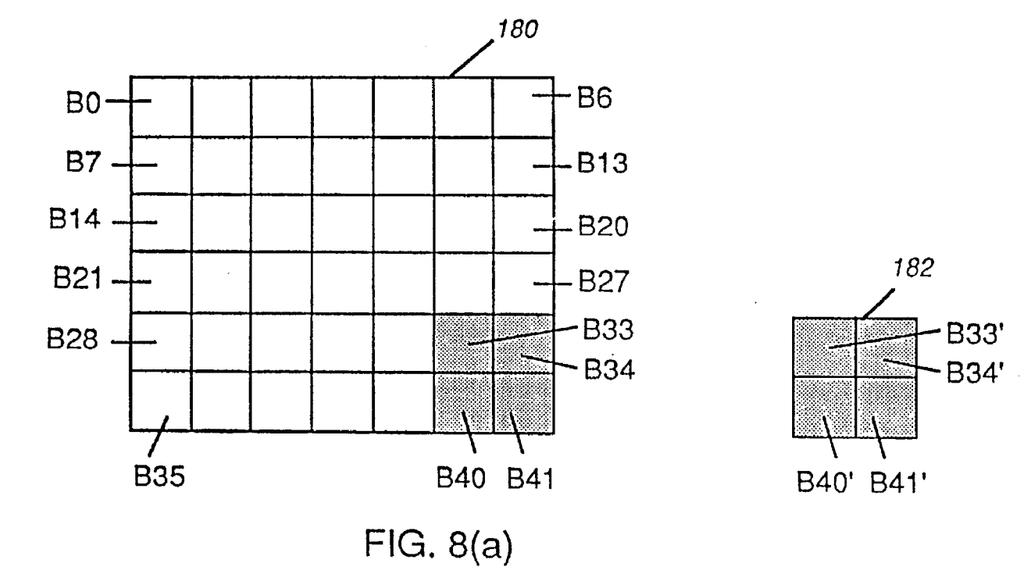
FIGS. 8(a) and 8(b) illustrate another method of how the subdivided regions of a main image and a sub-image are concatenated according to the present invention.
Figure 8B:
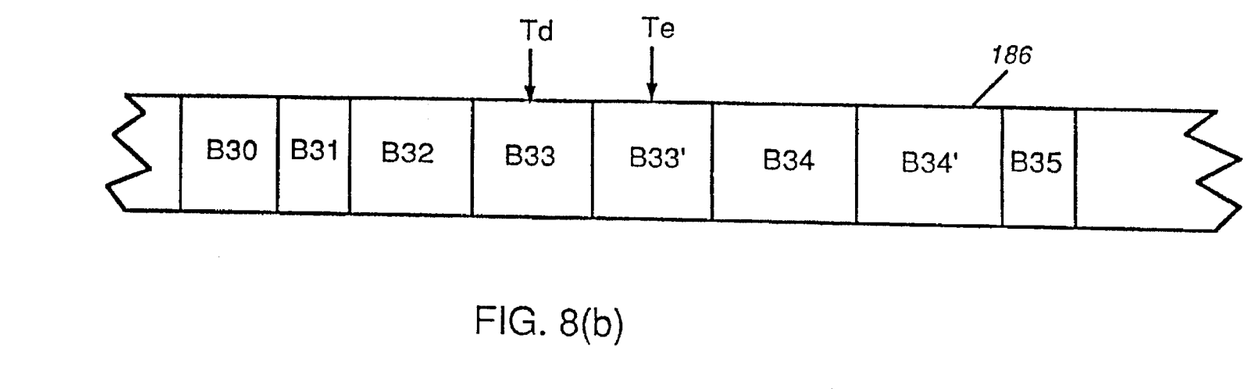

According to another variation of the present invention, the blocks are concatenated in such a way that the data of a main image block precedes those of a sub-image block when both blocks share the same location information. FIGS. 8(a) and 8(b) illustrate another method of how the subdivided regions of a main image and a sub-image are concatenated. As shown in FIG. 8(a), main image 180 and sub-image 182 are subdivided in a similar manner as shown in FIG. 4(a). Sub-image 182 is superimposed on the shaded region of main image 180. The main and sub-images are compressed and encoded into main and sub-image data streams by the apparatus shown in FIG. 1. The two data streams are next multiplexed at MUX 152. Referring to FIG. 3, the location information of the main and sub-image are first compared at a comparator 151. If the location information are not the same, switch 149 is connected to port 147 where the data streams of the main image is outputted. If the location information coincide, switch 149 is first connected to port 147 to let through the data stream of the main image block. Next, switch 149 is connected to port 145 to let through the data stream of the sub-image block. The process repeats for all the blocks of the data streams of the main and sub-image. The data streams of main image 180 and sub-image 182 thus concatenated is shown in FIG. 8(b). In data stream 186, block B33 precedes B33', block B34 precedes B34'. Similarly, block B40 precedes B40' and block B41 precedes B41' (not shown in the diagram).

Figure 9:
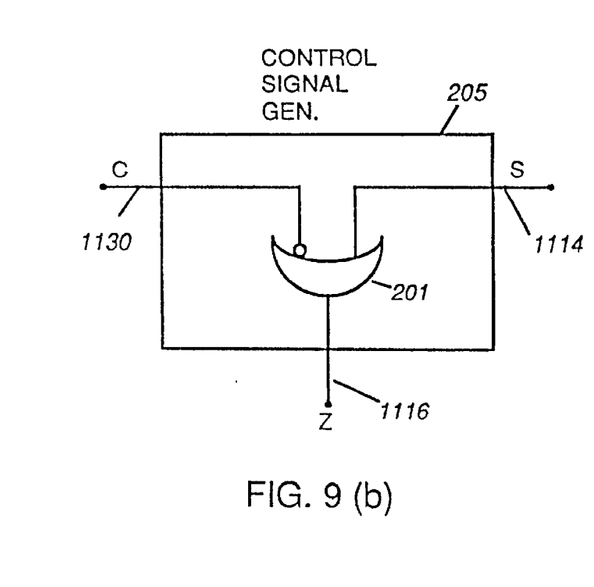
FIG. 9(a) is a flow chart of the decoding method of a data stream concatenated in the manner shown in FIG. 8(b).
FIG. 9(b) is the corresponding block diagram of the control signal generator shown in FIG. 6.

The data stream thus obtained is decoded by the decoding apparatus shown in FIGS. 5 and 6 as described above. FIG. 9(b) shows a simple logic circuit for implementing the control signal generator 205 designed for decoding data stream 186 of FIG. 8(b). When C=0 (location information not coincide), an ON signal (Z=1) is outputted regardless of the external input signal S. When C=1 (location information coincide), the external input signal S is outputted as signal Z. The flow chart in FIG. 9(a) explains how the sub-images can be selectively displayed.

FIG. 9(a) is a flow chart of a decoding method of the concatenated data stream shown in FIG. 8(b). The data stream 186 is input at step 20. At step 21, each block is decoded and decompressed as described above. At step 22, the location information of the current block is compared with that of the previous block. If the location information differ, it indicates that the location is not for superimposing sub-image 182. The decoded data is outputted to a frame memory at step 25. If the location information coincide, it indicates that the location is for superimposing sub-image 182. Next, at step 23, it is checked whether to display sub-image 182 or not, as selected by the viewers. If sub-image 182 is not to be displayed, proceed to step 24. As shown in FIG. 8(b), at timing Te, the previous block B33 carries the data of main image 180. Therefore, by discarding the data of the current block, B33', the data of the previous block (main image) remain in the frame memory. If sub-image 182 is to be displayed, the data of the current block is outputted to the frame memory at step 25. In this manner, the data of main image 180 at the same location is over-written by the data of sub-image 182 and hence enabling the display of sub-image 182.

Figure 10:
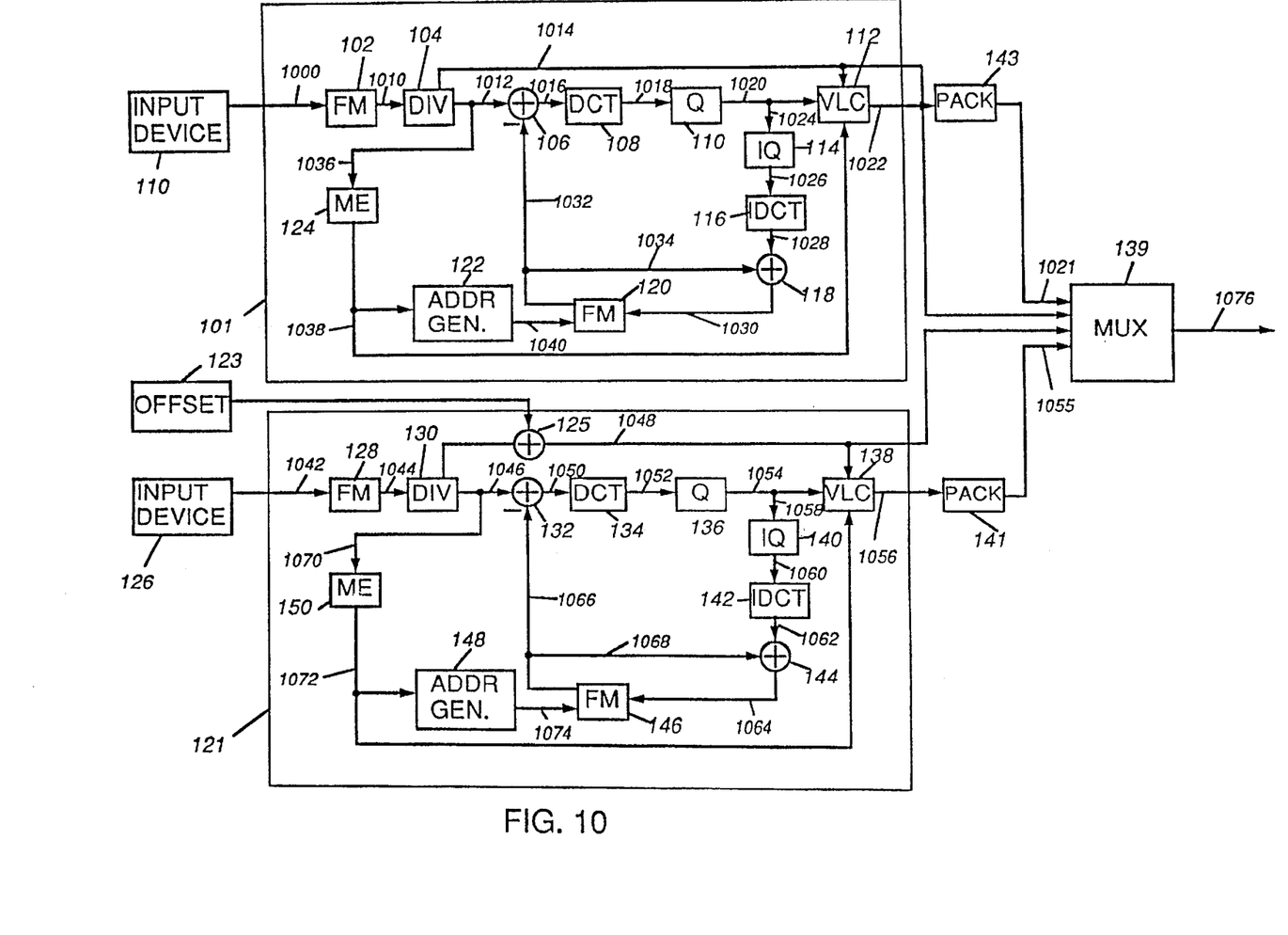
FIG. 10 is a block diagram of an embodiment of an apparatus for multiplexing the packetized data of a main image sequence and a sub-image sequence in accordance with the present invention.
Figure 11A:
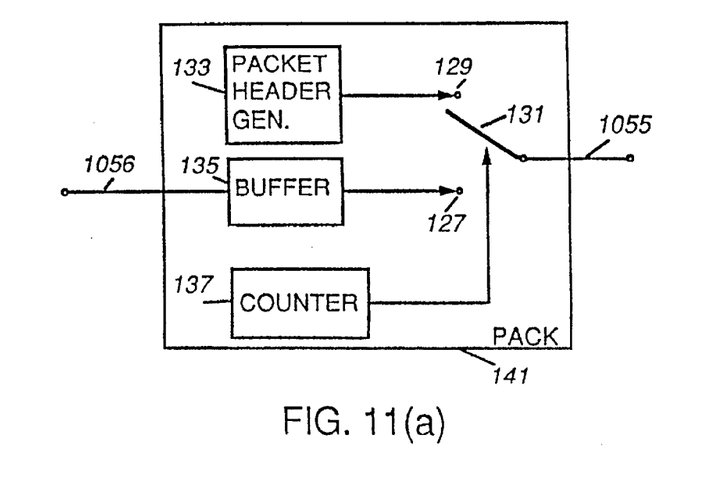
FIG. 11(a) is a block diagram of an example of a packetizer illustrated in FIG. 10
Figure 11B:
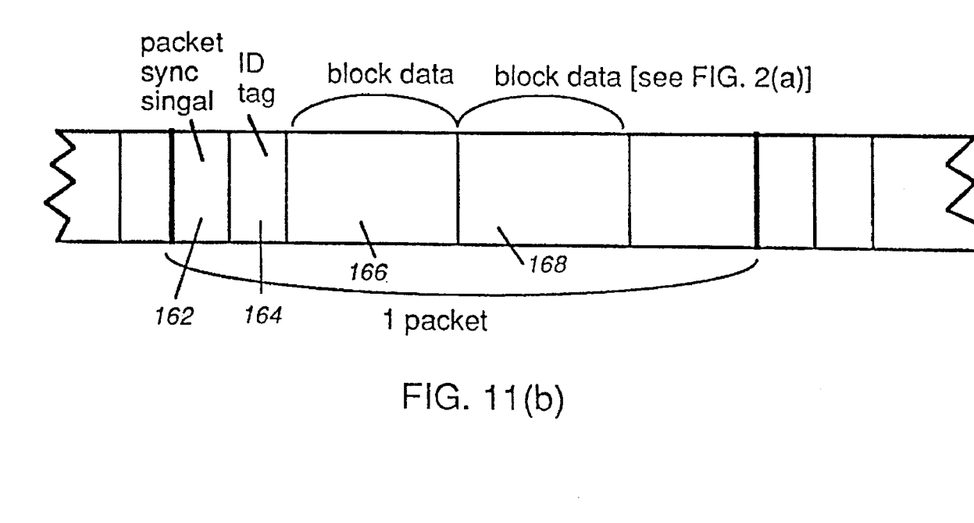
FIG. 11(b) illustrates a packetized data stream.
Figure 12A:
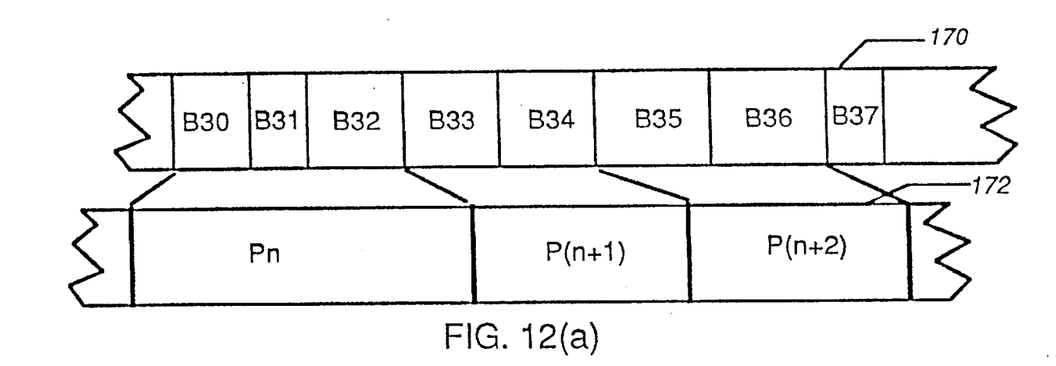
FIGS. 12(a)–(c) illustrate an example of how the packetized data streams of a main image and a sub-image are multiplexed according to the present invention.
Figure 12B:
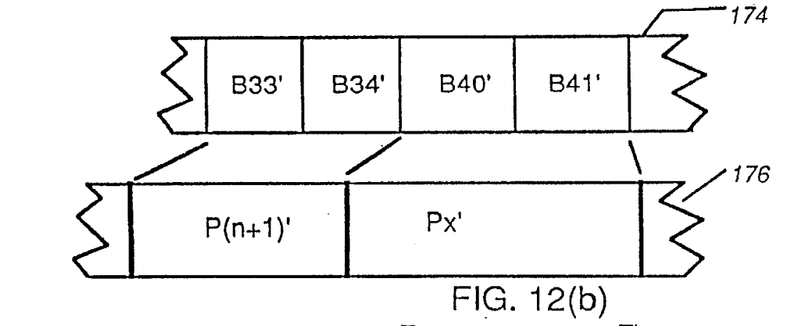

According to a third variation of the present invention, the data streams of the main and sub-images are first arranged into units of packets prior to multiplexing the packets. FIG. 10 is a block diagram of an embodiment of an apparatus for multiplexing the packetized data of a main image sequence and a sub-image sequence in accordance with the present invention. Main image 180 is provided by input device 110, encoded by encoder 101 producing the main image data stream. Similarly sub-image 182 is provided by input device 126, encoded by encoder 121 producing the sub-image data stream. The main and sub-image data streams are respectively packetized by packetizers 143 and 141. Finally, the packetized data streams are multiplexed in a multiplexer 139. The operations of encoders 101 and 121 are exactly the same as described before. FIG. 11(a) shows a block diagram of the packetizer 141. The data stream is input via line 1056 and store in a buffer 135. A switch 131 is first connected to a packet header generator 133 where the synchronization signal and identification tag indicative of the sub-image 182 are sent out via line 1055. Next, switch 131 is coupled to buffer 135 to let through the data stream. A counter 137 counts the number of bits outputted from the buffer 135. When the counter reaches a predetermined value (for example 188 bytes), switch 131 is again coupled to port 129. The data stream thus packetized is shown in FIG. 11(b). The packet synchronization signal 162 is represented by 32 bits and the identification tag 164 is represented by 4 bits. The block data 166, 168 are as depicted in FIG. 2(a). Similarly, packetizer 143 packetizes the main image data stream. In a preferred manner, a packet contains a fixed number of bits (188 bytes). However, packets of variable length are possible. Several blocks of data can be arranged into one packet. For regions where main and sub-images are superimposed, it is preferred to group the same number of blocks into a packet. An example is shown in FIGS. 12(a) and (b). Blocks B33 and B34 are grouped into packet P(n+1) while blocks B33' and B34' are grouped into packet P(n+1)'. Similarly, blocks B40 and B41 are grouped into packet Px (not shown in the diagram) while blocks B40' and B41' are grouped into packet Px'.

Figure 12C:
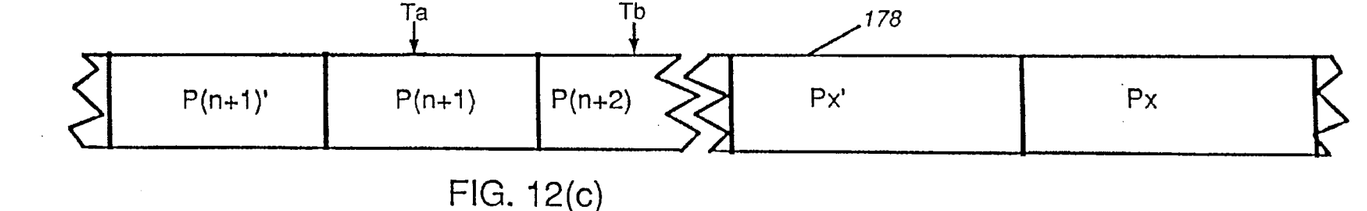

The packetized data streams 172 and 176 are then multiplexed in MUX 152. The block diagram of MUX 152 is the similar to that shown in FIG. 3. The location information and packetized data stream of the main image are fed in through port 131 (via line 1014) and 133 (via line 1021) respectively, while the location information and data stream of the sub-image are fed in through port 135 (via line 1048) and 137 (via line 1055) respectively. As a packet may contain several blocks, the location information of the first block in a packet is used for comparison. The location information of the main and sub-image packets are compared at a comparator 151. If the location information are not the same, switch 149 is connected to port 147 where the packetized data streams of the main image is outputted. If the location information coincide, switch 149 is connected to port 145 and 147 alternatively. First, switch 149 is connected to port 145 to let through the packetized data stream of the subimage. Next, switch 149 is connected to port 147 to let through the packetized data stream of the main image. The packetized data streams of main image 180 and sub-image 182 thus multiplexed is shown in FIG. 12(c). In data stream 178, packet P(n+1)' precedes P(n+1) and packet Px' precedes Px.

Figure 13:
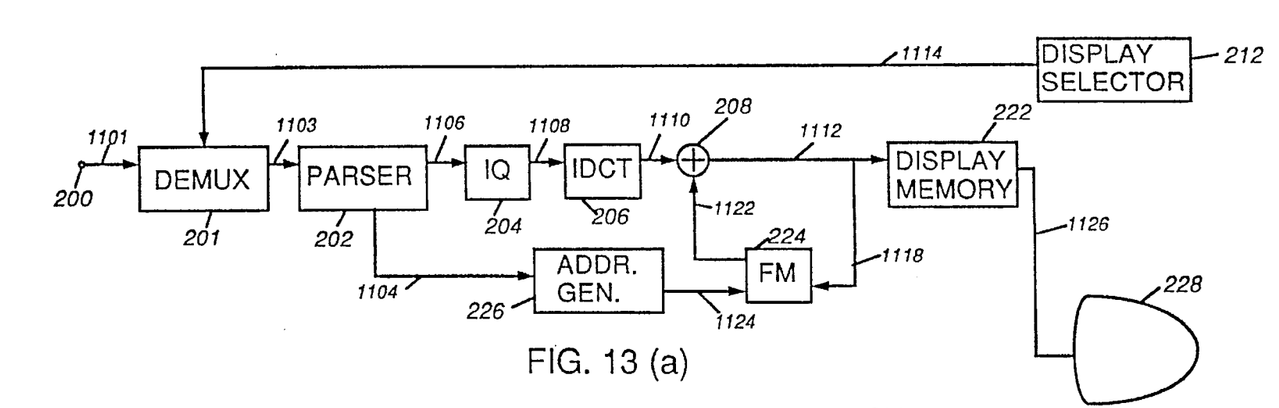
FIG. 13(a) is a block diagram of an embodiment of a decoding apparatus for demultiplexing and subsequently decoding the packetized data stream multiplexed in the manner shown in FIG. 12(c).
FIG. 13(b) is a block diagram of the demultiplexer illustrated in FIG. 13(a).

A multiplexed data stream thus obtained is demultiplexed and decoded in the following manner. FIG. 13(a) is a block diagram of an embodiment of an apparatus for demultiplexing and decoding a data stream multiplexed in a manner according to the present invention. The data stream is input through port 200 to a demultiplexer 201 via line 1101. The demultiplexer also receives an external input signal (S) provided by a display selector 212 via line 1114. The demultiplexer 201 selects the packets to be decoded and sent the selected block data to a parser 202 via 1103. The parser 202 parses the input data stream to extract data for decompression as described above. The output of the adder 208 is transferred directly to the memories 222 and 224.

The block diagram of the demultiplexer 201 is shown in FIG. 13(b). The packetized data stream is input to a detector 230 via line 1101. Detector 230 extracts the identification tag of each packet and sent it to a comparator 232. At comparator 232, the identification tag is compared to the main and sub-image identification tags. If the identification tag indicates the main image, the comparator 232 outputs a signal C=1. If the identification tag indicates the sub-image, the comparator 232 outputs a signal C=0. The output of comparator 232 is delayed by a delay 234. The delay 234 outputs the signal C as signal P at the next packet period. The signals C, P and S (via line 1114) are used to generate a control signal by a logic circuit 238 to control a switch 236. When the control signal (via line 1136) is an ON signal, switch 236 is coupled to port 240, passing through the data of the blocks contained in the packet. The flow chart in FIG. 14 explains how the sub-images can be selectively displayed.

Figure 14:
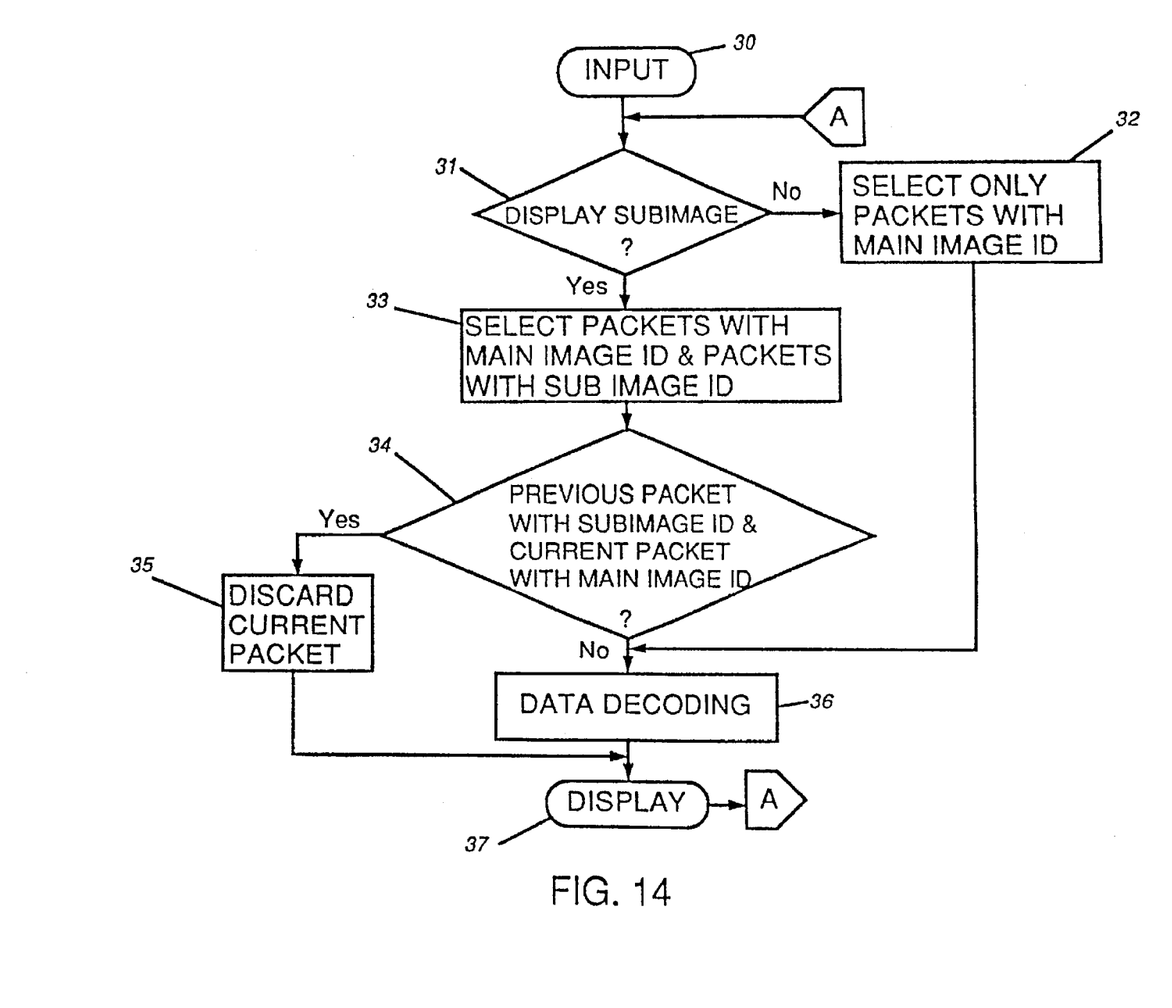
FIG. 14 is a flow chart of a demultiplexing method of the data stream multiplexed in a manner shown in FIG. 12(c).

FIG. 14 is a flow chart of a demultiplexing method of the packetized data stream multiplexed in a manner shown in FIG. 12(c). First, a multiplexed data stream 178 is input at step 30. At step 31, it is checked whether to display sub-image 182 or not, as selected by the viewers. If sub-image 182 is not to be displayed, proceed to step 32 where only packets carrying the main image identification tag are selected while packets carrying the sub-image identification tag are discarded. Next at step 36, all the selected packets are decoded and then displayed at step 37. Thus, main image 180 is obtained.

If sub-image 182 is to be displayed, proceed to step 33 where both packets carrying the main image identification tag as well as packets carrying the sub-image identification tag are selected. At step 34, the identification tag of the current packet is checked. Referring to FIG. 12(c), at timing Ta, the previous packet P(n+1)' carries the sub-image identification tag while the current packet P(n+1) carries the main image identification tag. Noting that successive packets where sub-image precedes main image shares the same location information, we know that the data carried by the current packet belong to a region where the sub-image is to be displayed. Therefore, we proceed to step 35 where the current packet which carries the data of the main image, is discarded. Next, consider timing Tb of FIG. 12(c). At timing Tb, the current packet P(n+2) carries the main image identification tag, but the previous packet P(n+1) does not carry the sub-image identification tag. We know, therefore, that the location information of the two packets, P(n+1) and P(n+2), are not the same. This implies that the data carried by the current packet P(n+2) does not belong to a region where sub-image 182 is to be superimposed. Therefore we proceed to decode the current packet P(n+2) at step 36 for display at step 37.

A similar demultiplexing process is possible when two packets carrying the same location information are multiplexed in such a way that a packet of the main image precedes a packet of the sub-image. In this case, the data of a packet has to be temporally stored. After checking the identification tag of the succeeding packet, we can decide whether or not to discard the stored data.

Although the invention has been described in connection with the above preferred embodiments, those skilled in the art would appreciate that numerous modifications and adaptations may be made thereto without departing from the spirit and scope of the invention as set forth in the appended claims.

What is claimed is:

1. A method of encoding a main image and at least one sub-image for superimposing on said main image, comprising the steps of:

subdividing said main image into a plurality of main image regions each containing a matrix of pixels;

compressing and encoding each of said main image regions including information indicative of a location of each of said main image regions in said main image to obtain encoded main image regions;

subdividing said sub-image into a plurality of sub-image regions each containing a matrix of pixels;

compressing and encoding each of said sub-image regions including information indicative of a location where each of said sub-image regions is to be superimposed on said main image to obtain encoded sub-image regions;

concatenating said encoded main image regions and said encoded sub-image regions in such a manner that an encoded main image region and an encoded sub-image region which share same location information are concatenated consecutively.

2. A method according to claim 1, wherein the encoded main image region and the encoded sub-image region which share the same location information are of the same in size.

3. An encoding method according to claim 2, wherein the encoded main image region and the encoded sub-image region which share the same location information are concatenated in such a manner that the encoded sub-image region precedes the encoded main image region.

4. A method according to claim 2, wherein the encoded main image region and the encoded sub-image region which share the same location information are concatenated in such a manner that the encoded main image region precedes the encoded sub-image region.

5. A method of decoding an encoded video sequence arranged such that a main image region and a sub-image region which share same location information are concatenated in such a manner that the sub-image region precedes the main image region, comprising the steps of:

decoding a current region to obtain decoded data;

comparing location information of said current region with location information of a previous region; and performing, if the location information of said current region is the same as the location information of said previous region, selectively one of the following steps (1) and (2):

(1) discarding the decoded data of said current region when displaying said sub-image; and (2) displacing the decoded data of said previous region with the decoded data of said current region when not displaying said sub-image.

6. A method of decoding an encoded video sequence arranged such that a main image region and a sub-image region which share same location information is concatenated in such a manner that the main image region precedes the sub-image region, comprising the steps of:

decoding a current region to obtain decoded data;

comparing location information of said current region with location information of a previous region; and performing, if the location information of said current region is the same as the location information of the previous region, selectively one of the following steps (1) and (2):

(1) discarding the decoded data of said current region when not displaying said sub-image; and (2) displacing the decoded data of said previous region with the decoded data of said current region when displaying said sub-region.

7. An apparatus for decoding an encoded video data stream of a main image and at least one sub-image, each of the main image having been divided into a plurality of main image regions, each of the sub-image having been divided into a plurality of sub-image regions, and each of said main image regions and said sub-image regions having been compressed and encoded into data stream inclusive of location information, compressed image data and other side information, said apparatus comprising:

parsing means for parsing said video data stream, extracting said location information, said compressed image data and said other side information of each of said regions;

decompressing means coupled to said parsing means for decompressing said compressed image data based on said other side information to obtain decompressed image data;

switching means coupled to said decompressing means for selectively outputting said decompressed image data;

storage means coupled to said switching means for storing said decompressed image data;

selection means for receiving an externally given control signal which controls the display of said sub-image;

control means coupled to said parsing means and said selection means for generating an ON/OFF signal based on the location information and said control signal from said selection means to control said switching means.

8. An apparatus according to claim 7, wherein the encoded video sequence having been arranged such that a main image region and a sub-image region which share same location information are concatenated in such a manner that encoded data stream of the sub-image region precedes encoded data stream of the main image region, and wherein said controlling means compares the location information of a current region with the location information of a previous region, generates an ON signal if the location information of said current region differs from the location information of said previous region, and performs, if the location information of said current region is the same as the location information of said previous region, selectively one of functions of (1) generating an OFF signal when displaying said sub-image and (2) generating an ON signal when not displaying said sub-image.

9. An apparatus according to claim 7, wherein the encoded video sequence having been arranged such that a main image region and a sub-image region which share same location information are concatenated in such a manner that encoded data stream of the main image region precedes encoded data stream of the sub-image region, and wherein said controlling means compares the location information of a current region with the location information of a previous region, generates an ON signal if the location information of said current region differs from the location information of said previous region, and performs, if the location information of said current region is the same as the location information of said previous region, selectively one of functions of (1) generating an OFF signal when not displaying said sub-image and (2) generating an ON signal when displaying said sub-image.

10. A method of multiplexing, in units of packets, a main image and at least one sub-image for superimposing on said main image, comprising the steps of:

subdividing said main image into a plurality of main image regions each containing a matrix of pixels;

compressing and encoding each of said main image regions to obtain an encoded main image data, including location information indicative of a location of each of said main image regions in said main image;

packetizing said encoded main image data into units of main image packets;

appending a first identification tag indicative of said main image to each of said main image packets;

subdividing said sub-image into a plurality of sub-image regions each containing a matrix of pixels;

compressing and encoding each of said sub-image regions to obtain an encoded sub-image data, including location information indicative of a location where said sub-image region is to be superimposed on said main image;

packetizing said encoded sub-image data into units of sub-image packets;

appending a second identification tag indicative of said sub-image to each of said sub-image packets;

multiplexing said main image packets and sub-image packets in such a manner that packets with same location information are concatenated consecutively.

11. A method according to claim 10, wherein a main image region and a sub-image region which share same location information are the same in size.

12. A method according to claim 11, wherein a main image packet and a sub-image packet which share same location information are multiplexed in such a manner that said sub-image packet precedes said main image packet.

13. A method of demultiplexing a packetized encoded video data multiplexed in such a manner that a packet carrying a second identification tag precedes a packet carrying a first identification tag when said packets share same location information, comprising the steps of:

(1) selecting only packets carrying said first identification tag when not displaying said subimage; and (2) selecting packets carrying said first identification tag as well as packets carrying said second identification tag, and then, discarding a packet carrying said first identification tag which follows a packet carrying said second identification tag when displaying said sub-image.

* * * * *